May 6, 1969 R. W. REICH 3,443,242
TRANSISTOR PULSE GENERATOR ENERGIZABLE FROM AC OR DC
Filed Nov. 30, 1966
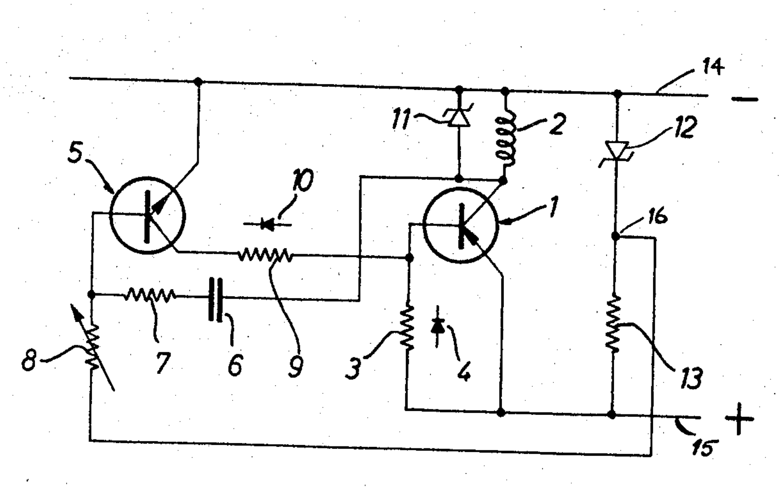
INVENTOR:
R. W. REICH
BY: Moore & Hall
ATTORNEYS.

United States Patent Office 3,443,242

Patented May 6, 1969

3,443,242

TRANSISTOR PULSE GENERATOR ENERGIZABLE FROM AC OR DC

Robert Walter Reich, Freiburg im Breisgau, Germany (Via Noseola 8, Lugano-Ruvigliana, Switzerland)

Filed Nov. 30, 1966, Ser. No. 597,955
Int. Cl. H03b 3/04
U.S. Cl. 331—71 2 Claims

ABSTRACT OF THE DISCLOSURE

A transformerless blocking oscillator is disclosed which comprises two transistors so coupled together that the frequency of the resulting output is substantially independent of temperature and supply voltage fluctuation. Initially both transistors are cut off, the first by a charge on a capacitor, the second by the first. As the capacitor charges, the first transistor reaches is threshold and conducts, causing the second transistor to conduct. Conduction of the second transistor also reverses the charge on the capacitor which blocks the first transistor, which in turn blocks the second transistor. This action is then repeated. Zener diodes are used to stabilize the supply voltages and also allow the circuit to operate from an AC source as well as a DC source.

The present invention relates to pulse generator circuits adapted to be used in automatic timer arrangements, and is more particularly concerned with a blocking oscillator circuit for such use.

Various forms of blocking oscillator circuits have been suggested heretofore. In general, all of these prior circuits require an input signal from a trigger source to unblock the oscillator e.g. if the oscillator comprises a germanium transistor, a negative input pulse is required for unblocking purposes. Such blocked oscillator circuits cannot therefore easily be used as automatic timers.

Various forms of multivibrators have also been suggested, including multivibrators employing transistors; but these circuits are very sensitive to variations in temperature and applied voltage. As a result, prior multivibrators can be used as timer circuits only if accuracy is no consideration i.e. time differences of up to 50% or more can occur with variations in temperature or voltage. Such multivibrators are, accordingly, unsuitable for use as timers in watches or clocks, or as impulse generators in precision switching apparatus. Moreover, it is extremely difficult to stabilize such multivibrators in such a manner that they can operate independently of voltage and temperature, particularly when an ordinary dry cell is used as a power source. The voltage of such a cell may vary, for example, from 1.6 to 1 volt in the course of use.

It is the object of the present invention to design a blocked oscillator circuit whose output frequency is substantially independent of temperature and voltage, and which automatically produces accurate timing pulses.

Another object of the present invention resides in the provision of a pulse generator circuit which can utilize either an AC or DC source for energization purposes.

A further object of the present invention resides in the provision of an oscillator circuit which can be used as an extremely accurate timer for watches and clocks.

In providing for the foregoing objects and advantages, the present invention contemplates the provision of a timing circuit comprising a switching transistor having its collector and its emitter-base circuits connected substantially as a diode. The switching transistor is associated with a gating transistor, preferably of the silicon type, which is connected to aforementioned switching transistor for selectively applying an actuating impulse to said switching transistor. The timing of said actuating impulse, i.e. the firing of the silicon gating transistor, is under the control of a capacitor whose charge is varied in a novel manner to selectively initiate conduction and blocking of the gating and switching transistors.

The circuit of the present invention, and its manner of operation, will become more readily apparent from the following description taken in conjunction with the accompanying drawing. The drawing comprises a schematic representation of a circuit constructed in accordance with the present invention.

Referring now to the drawing, it will be seen that a switching transistor 1 has its collector connected via a pulse emitting coil 2 to the negative side 14 of an energization source 14–15. As will appear hereinafter, source 14–15 may be either an AC or DC source; but for purposes of initial discussion, it will be assumed that the source is DC, having the polarities indicated on the drawing. The emitter of transistor 1 is connected to the positive side 15 of said source, and the base of transistor 1 is also connected to said positive side 15 through either a resistor 3, or a diode 4 poled as shown. The manner of connection is such that no current flows through transistor 1 in its state of rest; and in this cut-off state, the base of transistor 1 can, for all practical purposes, be considered to have the same voltage as the emitter of said transistor 1.

A silicon gating transistor 5 has its emitter connected to the negative side 14 of the source 14–15. The collector of transistor 5 is connected to the base of switching transistor 1 through either a resistor 9, or a diode 10 poled as shown. The base of gating transistor 5 is connected to the junction of a pair of resistors 7 and 8 in an RC timing circuit which includes a capacitor 6. The state of conduction of gating transistor 5 depends upon the charge potential across capacitor 6, and the state of conduction of said gating transistor 5 in turn controls the state of conduction of switching transistor 1.

More particularly, the right-hand side of capacitor 6 is connected via pulse emitting coil 2 to the negative side 14 of the energization source. The left hand side of capacitor 6 is connected via resistor 7 and a variable resistance 8 to an energization point 16 disposed between a Zener diode 12 and a resistance 13. Zener diode 12 and resistance 13 are placed across source 14–15, to stabilize the voltage at point 16. This in turn stabilizes the charging current which flows from point 16 through resistors 8 and 7 to capacitor 6. Resistor 7 forms, in conjunction with capacitor 6, an RC charging circuit having a time constant which determines the instant at which silicon gating transistor 5 is rendered conductive. Variable resistance 8, which also forms a portion of this timing circuit, can be used to adjust the timing, i.e. the pulse sequence of the overall circuit. Silicon gating transistor 5 is normally non-conductive. It has a threshold voltage of approximately 0.6 to 0.7 volt; and when a potential of this magnitude is applied to the base of transistor 5, transistor 5 is rendered conductive.

Let us now assume that the circuit is in its quiescent state with both transistors 1 and 5 non-conductive; and let us further assume that source 14–15 is then connected into the circuit. A charging current flows from point 16 (or positive pole 15 of the source, if the voltage stabilization arrangement 12, 13 is not employed) through resistors 8 and 7 to the capacitor 6, and thence through pulse emitting coil 2, connected to the collector of switching transistor 1, to the negative terminal 14 of the energization source. When the charge across capacitor 6 reaches the threshold voltage of silicon gating transistor 5, transistor 5 commences conduction. A signal appears at the collector of transistor 5, which is coupled to the base of switching transistor 1, thereby causing conduction of switching transistor 1 to commence. The conduction of transistor 1 produces a positive voltage at its collector which causes a pulse of current to flow through the pulse emitting coil 2 to the negative side 14 of the energization source. The positive voltage which thus appears at the collector of switching transistor 1 is also applied, by reason of the connections employed, to the right hand side of capacitor 6, thereby causing the charge on capacitor 6 to be completely reversed. This again blocks conduction of the silicon gating transistor 5, which in turn cuts off switching transistor 1, whereby the circuit reverts to its initial state with the right hand side of capacitor 6 being effectively connected through pulse emitting coil 2 to the negative side 14 of the energization source.

The process repeats itself continually with transistors 5 and 1 being driven into conduction and then cut off, whereby a sequence of pulses are emitted by coil 2. The timing of these pulses is determined by resistors 7 and 8 (resistor 7 being very small in relation to resistor 8); and the pulse sequence can be adjusted by adjustment of resistor 8. Resistor 9 between the collector of silicon transistor 5 and the base of switching transistor 1 is intended to limit the current that can flow through transistor 1.

The circuit has a number of advantages over circuits suggested heretofore. The pulse sequence frequency always remains the same, and is independent of voltage and temperature. Any variations in voltage and temperature merely vary the duration of the "on" period i.e. the keying ratio between the "on" and "off" period. This, however, is of no importance in timers; and the important thing is only that the switching sequence, or actual frequency of the system, is kept constant notwithstanding variations in factors such as voltage and temperature. By using a silicon transistor 5, instead of diodes such as have been employed in timing circuits heretofore, the threshold voltage requirements of the silicon transistor 5 assure that the frequency is kept constant within very wide variations in temperature and voltage.

Transistor 1 can be of either the germanium or silicon type. If the transistors 1 and 5 are both silicon transistors, they should be of opposite types i.e. transistor 5 should be of the N-P-N type if transistor 1 is of the P-N-P type.

If the switching frequency of the circuit is to be kept constant within very wide temperature limits, the resistance 9 can be of the type having a negative temperature coefficient. Alternatively, resistance 7 can be of the negative temperature coefficient type, or the capacitor 6 can be bypassed with such a resistance. The circuit is capable of use in a wide variety of applications, and is especially valuable when it is desired to effect emission of relatively low frequency pulses e.g. one c.p.s. or ten c.p.s. Very perfect timing takes place, so that the time pulses produced at coil 2 can be used directly in clocks or watches, or can be used as a time signal, or for time marking purposes etc.

Another advantage of the circuit consists in the fact that it can be operated directly on alternating current, rather than direct current. Thus the power supply 14–15 can be of the AC type, having a frequency of 50 c.p.s. or 60 c.p.s. for example. With such an alternating source, only one-half of the alternating current wave is employed for energization purposes, and the circuit operates to effect charging of capacitor 6 in a series of incremental steps, occurring respectively each time that terminal 15 goes positive to terminal 14. The circuit can be so designed that a particular number of half waves of energization must occur before the charge across capacitor 6 reaches a potential sufficient to fire transistor 5. For example, with an alternating source across 14–15, the parameter values of capacitor 6, and of resistors 7 and 8, can be so selected that sixty successive half waves of energization must occur before the capacitor 6 is charged to the threshold potential of transistor 5. As a result, a form of frequency division occurs, in that a plurality of pulses of energization must occur before capacitor 6 is charged to an extent sufficient to cause a switching impulse to be emitted from the gating transistor 5 to the switching transistor 1.

When high voltages are used for energization purposes, for example, if terminals 14–15 are to be connected to a commercial or house power source, appropriate resistances can be inserted in series with the collector and base circuits of the transistors 1 and 5 to cut down the voltages actually applied to those collector and base circuits. Alternatively, a voltage divider can be inserted in the line to reduce the actual potential applied across terminals 14 and 15. In any case, the voltages must be so adjusted that the capacitor 6 is charged to its desired potential through resistor 8 after occurrence of a number of half waves of energization, occurring over a period of time consistent with the desired frequency output of the circuit. In principle, any desired alternating current frequency can be applied across terminals 14 and 15, and can be transformed by the circuit of the present invention into desired low frequency switching pulses having high accuracy of timing. For very high frequencies of operation, it may be advantageous to use diodes 4 and 10 in place of the resistances 3 and 9 respectively.

The great advantage of the circuit of the present invention lies in the fact that the circuit is very simple, utilizes relatively few circuit elements, and can be used to construct an accurate timer adapted to be employed in many applications. When used in watches and clocks, in particular, all that is needed beside the pulse generator circuit described, is a seconds wheel and the succeeding minute and hour wheels. Advancement every second takes place automatically through the pulse output coil 2. The pulses which are generated across coil 2 can, of course, also be used to produce timing marks, or to produce any other desired operation by means of appropriate output circuits coupled to coil 2.

The switching and pulse amplitude of the output pulses can be stabilized by means of a Zener diode 11 connected across the coil 2. If the pulse output coil 2 has a high self-inductance, it is also advisable to shunt a capacitor across said coil 2 so as to prevent self-oscillation which might otherwise develop due to feedback from the entire system. Moreover, if it is desired to vary the keying ratio between the on-time and the off-time of the circuit, it is possible (with an alternating current energization source across terminals 14 and 15) to replace resistor 9 with an appropriate capacitor.

It will be appreciated that the circuit of the present invention does not operate like a multivibrator, wherein the circuit shifts from one state to the other, but operates to automatically form a switching impulse which is periodically delivered to the switching transistor 1. The particularly surprising effect of the circuit is that it makes no difference whether it is energized by direct current or by alternating current. In either case, the desired low-frequency output can still be achieved.

Having thus described my invention, I claim:

1. A pulse generator circuit for the emission of timing pulses comprising, first and second normally nonconductive transistors, a timing circuit having resistance and capacitance, an energization source, a voltage stabilizing resistor and Zener diode connected across said energization source, means coupling the junction of said Zener diode and said voltage stabilizing resistor to said timing circuit for charging said capacitance, a coil connected between the collector of said first transistor and one side of said energization source, means coupling said timing circuit to the base of said second transistor for causing said second transistor to conduct when the charge across said capacitance reaches a predetermined value, means coupling both the emitter and base of said first transistor to the other side of said energization source, means coupling the emitter of said second transistor to said one side of said energization source, means coupling the collector of said second transistor to the base only of said first transistor for rendering said first transistor conductive in response to conduction of said second transistor thereby to effect a flow of current from said first transistor through said coil to produce an output pulse across said coil, and means responsive to conduction of said first transistor for altering the charge on said capacitance to cut off both said second and first transistors thereby to terminate said output pulse.

2. The circuit of claim 1 wherein said energization source comprises an alternating current source operative to charge said capacitance to said predetermined value in a succession of incremental steps.

References Cited

UNITED STATES PATENTS

| | | | |
|---|---|---|---|
| 2,986,709 | 5/1961 | Myers | 331—111 X |
| 3,144,620 | 8/1964 | Raillard | 331—111 |
| 3,178,609 | 4/1965 | Skirvin | 331—111 X |

OTHER REFERENCES

Breslow, Infinite Zout Current Source Generates Long, Linear Sweeps, Electronic Design, July 19, 1965, pp. 28–31.

ROY LAKE, *Primary Examiner.*

S. H. GRIMM, *Assistant Examiner.*

U.S. Cl. X.R.

331—111, 113

UNITED STATES PATENT OFFICE
CERTIFICATE OF CORRECTION

Patent No. 3,443,242 May 6, 1969

Robert Walter Reich

It is certified that error appears in the above identified patent and that said Letters Patent are hereby corrected as shown below:

In the heading to the printed specification, line 5, "Via Noseola 8" should read -- Via Noseda 8 --.

Signed and sealed this 21st day of April 1970.

(SEAL)
Attest:

Edward M. Fletcher, Jr.
Attesting Officer

WILLIAM E. SCHUYLER, JR.
Commissioner of Patents